United States Patent
Sekine

[15] 3,692,323
[45] Sept. 19, 1972

[54] BABY CARRIAGE

[72] Inventor: Shinichi Sekine, 35-31 Shinkawa 6-chome, Mitaka-shi, Tokyo, Japan

[22] Filed: Oct. 22, 1970

[21] Appl. No.: 83,081

[30] Foreign Application Priority Data

April 13, 1970  Japan ..................... 45/31427
April 17, 1970  Japan ..................... 45/37389

[52] U.S. Cl. ............ 280/47.38, 280/41 B, 280/124 A
[51] Int. Cl. ....................................... B62b 11/00
[58] Field of Search ...... 280/36 B, 41 A, 41 B, 47.38, 280/47.4, 47.41, 124 A

[56] References Cited

UNITED STATES PATENTS

| | | | |
|---|---|---|---|
| 2,798,730 | 7/1957 | Smith | 280/47.4 |
| 2,634,137 | 4/1953 | Welden | 280/36 B |
| 3,191,958 | 6/1965 | Smith | 280/47.38 |
| 2,287,315 | 6/1942 | Kroll | 280/36 B |
| 3,504,925 | 4/1970 | Glaser | 280/36 B |

*Primary Examiner*—Benjamin Hersh
*Assistant Examiner*—Robert R. Song
*Attorney*—George B. Oujevolk

[57] ABSTRACT

A baby carriage with a lower section to hold wheels thereon, a pair of tubes extending transversely across the width of the baby carriage with a separate wheel axle for each wheel journaled therein including holding means holding said wheel axles in said tubes, an outer section on said wheel axles having wheels thereon, a pulling piece on said outer section with a spring connected thereto and spring support means on said lower section to which said spring is connected whereby each of said wheels is separately provided with a shock absorbing arrangement.

3 Claims, 9 Drawing Figures

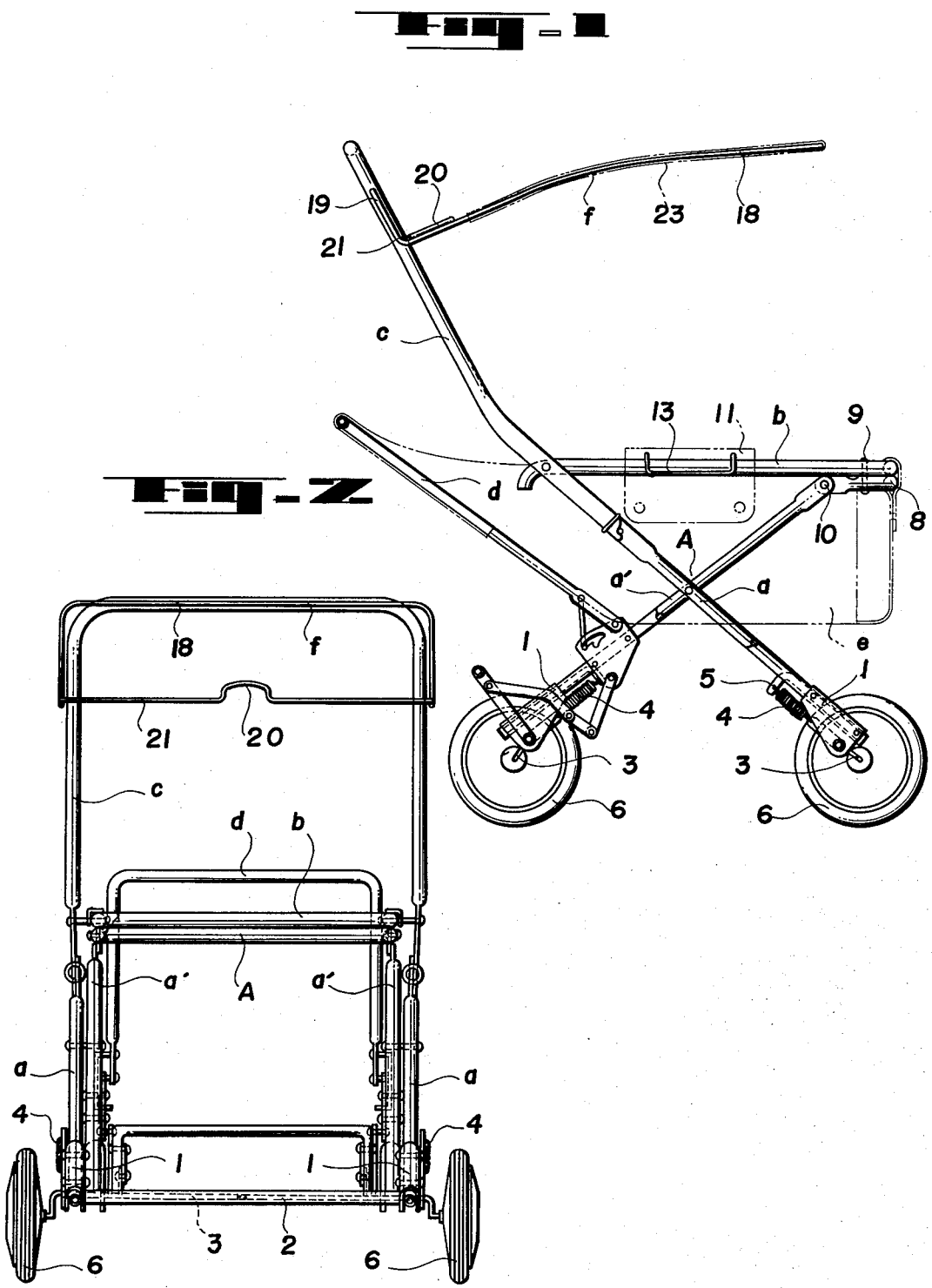

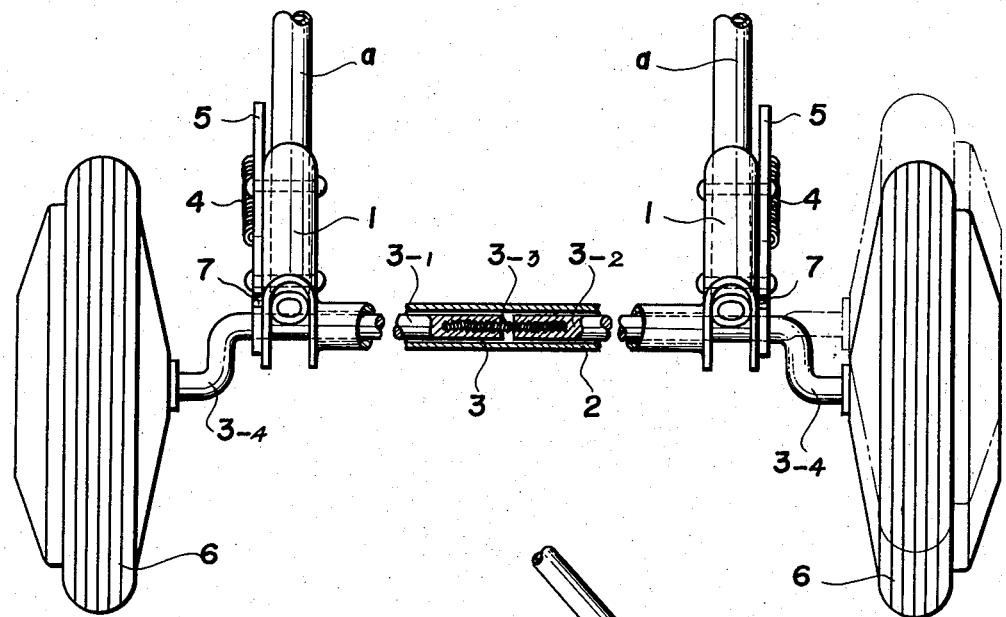
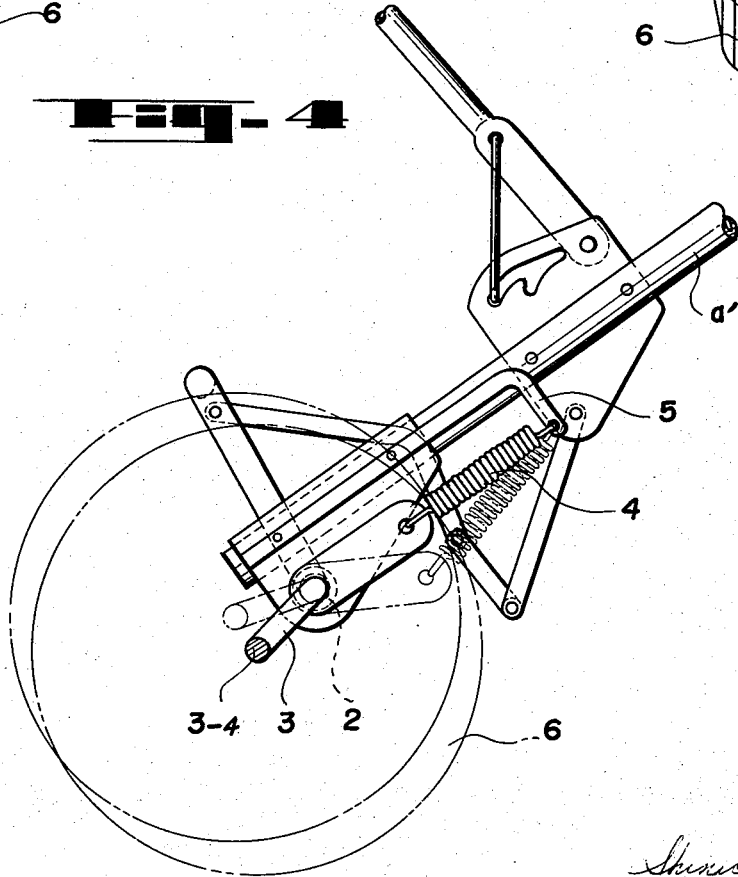

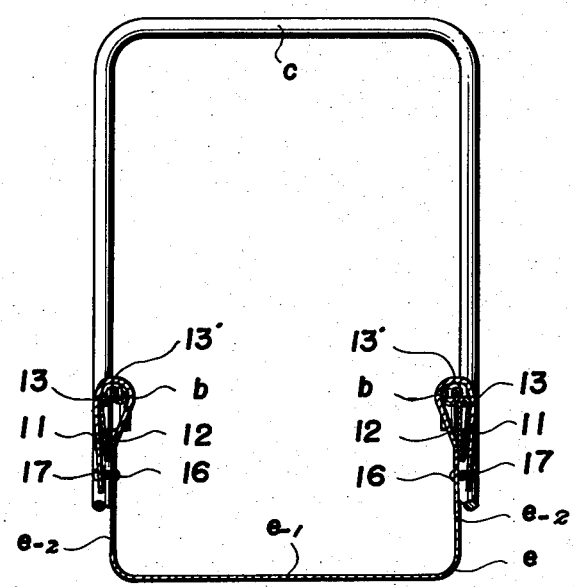
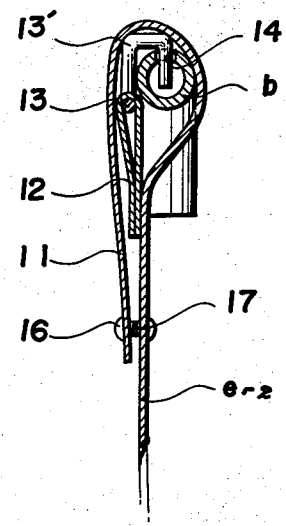
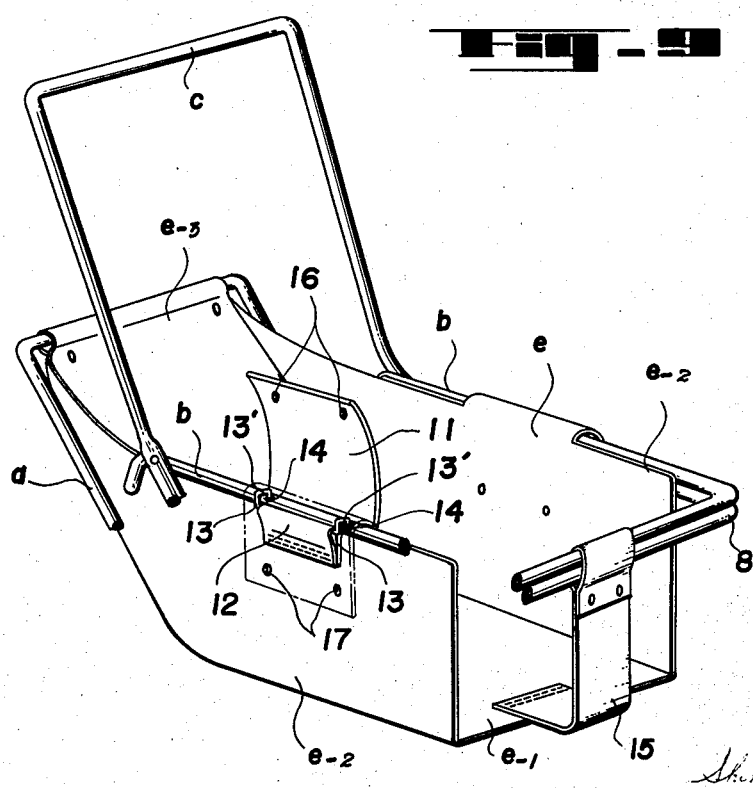

BABY CARRIAGE

BACKGROUND OF THE INVENTION

The present invention relates to a baby carriage having shock absorbing characteristics and more particularly to a baby carriage wherein each wheel has a shock absorbing arrangement independent of the other wheels.

BRIEF DESCRIPTION OF THE PRIOR ART

Conventional carriages presently in use are provided with springs between a carriage frame from which a hammock is slung and a chassis to which wheels are mounted so that shocks delivered to the carriage frame or to wheels are absorbed into or mitigated by the springs. There is, however, no shock absorbing arrangement between the chassis and wheels. Namely, wheels are rotatably mounted to the chassis, and right and left wheels are connected to each other by means of a single wheel-axle. Such an arrangement has led the baby carriage to incline or lose ballance when a pair of front or rear wheels, or even a single wheel among the four run over an obstacle.

Furthermore, the carriage frame has a tendency to roll and pitch when wheels pass over the obstacle. Thus, although springs may be provided to mitigate or absorb the up-down motion, rolling motion from side to side is not absorbed by the conventional arrangement so that rolling and shaking in conventional carriages is not very confortable. Broadly stated therefore, the present invention contemplates a baby carriage with a lower section to hold wheels thereon, a pair of tubes extending transversely across the width of the baby carriage with a separate wheel axle for each wheel journaled therein including holding means holding said wheel axles in said tubes, an outer section on said wheel axles having wheels thereon, a pulling piece on said outer section with a spring connected thereto and spring support means on said lower section to which said springs are connected whereby each of said wheels is separately provided with a shock absorbing arrangement.

SUMMARY OF THE INVENTION

The present invention contemplates overcoming the foregoing drawbacks of the conventional baby carriages by providing a baby carriage which is free from the effect of shocks has a solid and sturdy structure and in general, the baby carriage herein contemplated is so arranged that the carriage wheels are mounted on a wheel mounting section in such a manner that wheels freely move up and down and thus, act for absorbing or avoiding shocks, and furthermore, that each of four wheels moves independently.

The invention as well as other objects and advantages thereof will become more apparent from the following detailed description when taken together with the accompanying drawings.

BRIEF DESCRIPTION OF DRAWINGS

FIG. 1 is a side view, partially in section, of the baby carriage contemplated herein;

FIG. 2 shows a front view of the same;

FIG. 3 presents an enlarged front view of wheels and wheel axles of the baby carriage shown in FIG. 1;

FIGS. 4 and 5 are side views of rear wheel and front wheels respectively, illustrating the shock absorbing system;

FIG. 7 depicts a sectional front view of a hammock slinging section;

FIG. 8 is an enlarged front view of a part shown in FIG. 7; and,

FIG. 9 shows a perspective view of a carriage body upper part with the hammock.

DETAILED DESCRIPTION

Figure 5:
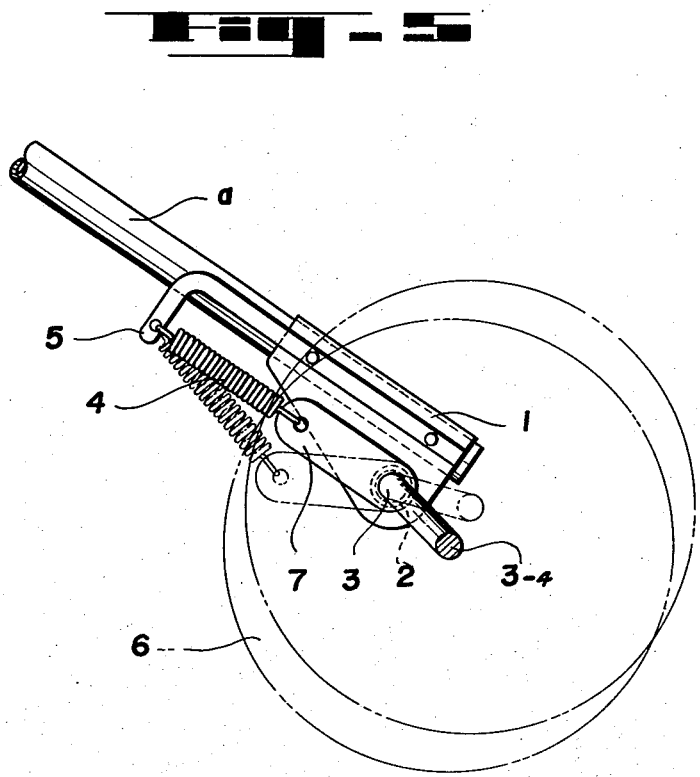
Figure 6:
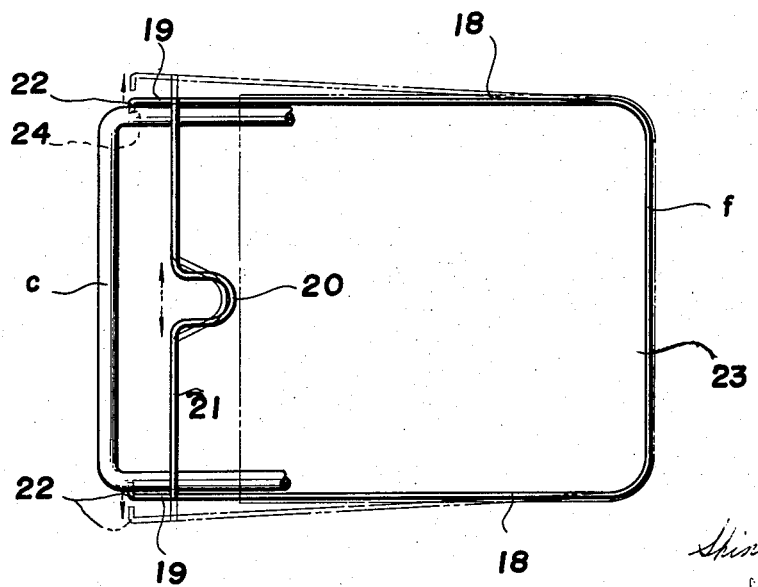
FIG. 6 is a plan view of a hood frame.

The main body of a baby carriage A has X-shaped legs $a$, $a'$, an upper frame arm $b$ and a hand arm $c$. The upper end of leg $a$ for a front wheel is pivoted to the hand arm $c$, and the upper frame arm $b$ is pivotally mounted to hand arm $c$ and connected to the upper end of the leg $a'$ for a rear wheel so that the carriage body A can be collapsibly folded. The upper frame arm $b$ is formed in a U-shape, the rear section of which is pivoted to a lower portion of the hand arm $c$, while the front part of the arm $b$ is reinforced thereunder with a U-shaped reinforcing frame 8 fixed to arm $b$ by pins 9. The outer end of the frame 8 is crushed to a flat shape so as to connect to a corresponding crushed flat end of the leg $a'$ by means of a pin 10 for a pivot movement of the leg $a'$.

The upper end of the leg $a'$ is positioned also just under the front part of the frame arm $b$ so as to support and strengthen the front part of the main body A.

Each of the lower ends of the front and rear legs $a$, $a'$ is fixed with respective support pieces 1 so as to support a tube 2 which is held transversely between right and left pieces 1, and through said tube a wheel axle 3 is journaled. The lower portion of each leg $a$, $a'$ is provided with a projecting piece 5 so as to pull a spring 4. Legs $a$, $a'$, the upper frame arm $b$ and a hand arm $c$ constitute a carriage frame, while an assembly of legs $a$, $a'$ including the lower portion of the legs $a$, $a'$ and the support piece 1 corresponds to a chassis.

Wheel axle 3 is formed with a left and a right stepped crankshaft sections 3–1, 3–2 on both sides of a stepped central threaded connecting rod 3—3 which connects both crankshaft sections 3–1, 3–2 with each other threads extend from its right and from left ends to the midsection so that right and left axles 3–2, 3–1 are screwed independently of each other. A wheel 6 is rotatably mounted to each of outer ends 3–4, 3–4 of left and right axles 3–1, 3–2, while a spring 4 is pulled between a pulling piece 7, which is fixed to each of left and right axles 3–1, 3–2, and a projecting piece 5 provided for legs $a$, $a'$. Spring 4 is compressed when an axle 3 rotates in such a manner that the axle 3 may recover its original state, thus the spring 4 acts to keep the axle 3 always in its place. This structure for the wheel mounting is repeated for each of the four wheels. When the carriage body A or wheels 6 receive a shock or a load, etc., the axle 3 rotates, and depending on the motion of the axle 3, the spring 4 expands or contracts so as to absorb or mitigate the shock or the load. This shock absorbing system functions independently at each of the four wheels 6.

A hammock $e$, composed integratedly of bottom $e$–1, sides $e$–2, and a back leaning portion $e$–3, hangs from an upper frame arm $b$ and on a back arm $d$. An upper margin for each side section e-2, is provided with a flap 11, while a sleeve piece 12, made of cloth or synthetic resin material, is attached to the uppermost end of each of the side sections e-2. In order to place the hammock e in the baby carriage body A, first, a sling arm 13 with both ends provided with an inverted L-shaped lock members 13', 13' is put loosely into a sleeve piece 12. The lock members 13', 13', which project from the cover sleeve 12 at both ends, are locked into set holes 14, 14 which open at the side part of the upper frame arm b so that the side section e-2 of the hammock e slung from the arm b. A sling piece 15 provided for a bottom e-1 and for a back leaning cloth e-3 is fixed to the front part of the upper frame arm b and to the back leaning arm d of the carriage body A. Then a flap 11 of the side cloth e-2 passed over the upper frame arm b in such a manner that set hooks 16 provided at edge portion of the flap 11 hook up and receive hooks of the side section e-2 to cover the sleeve 12 and the sling arm 13.

Next, a hood frame 15 is detachably mounted to the upper portion of a hand arm c. The frame 15 comprises an inverted U-shaped hood arm 18 wherein the outer part bends upward to form a hanging piece 19 and which end bends further to form a lock member 22, and a spring arm 21 with a U-turn 20 at the midsection, fitted transversely between right and left side arms of said hood arm 18. The hood arm 18 is fitted thereon with a hood 23 outstretched so that lock members 22 may be set into set holes provided at the upper portion of the hand arm c. With this arrangement, a spring arm 21 is fixed to the front of hand arm c and the hood 23 is held firmly above the car body A.

Thus, the present invention provides for a baby carriage wherein the wheels are so mounted on an axle as to move up and down freely and to act to absorb or to avoid shocks, the load or shock delivered to the carriage body or to wheels are, therefore, absorbed or mitigated by the axle and wheel arrangement.

Accordingly, if the wheel mounting system herein described is used on a baby carriage which has shock absorbers between the carriage frame and the chassis, the shock absorbing action or its effect is enhanced. A carriage equipped with the wheel mounting system of this invention is protected from shocks, even if the carriage frame and the chassis is not provided with the conventional shock absorbers so as to constitute a more solid or firm structure. And since the shock absorbing system of this invention works at a position lower than that of the conventional one, the baby carriage with this system is better stabilized or keeps better balance.

When one or two wheels go over an obstacle, only the wheel encountering the obstacle goes upward to avoid shock, and so another part of the carriage does not sink down and the carriage body level remains as high as ever. Furthermore, since each of the four wheels works independently for absorbing or avoiding shock, even when a single wheel encounters an obstacle, the carriage does not lose ballance unlike the conventional carriage wherein the chassis tends to incline and roll side to side.

An upper frame arm is provided at the underside of the front part of the baby carriage with an inverted U-shaped reinforced frame to which the uppermost end of a leg for a rear wheel is pivotally mounted. So, the end of the leg, positioned immediately under the upper frame arm, does not project over the side of the frame arm as has often been the case with the conventional leg having an uppermost end pivoted directly to the upper frame arm. The baby carriage according to the invention is, therefore, free from such accidents as where a baby squeezes its finger in an opening between the uppermost end of the leg and the upper frame arm, or a string etc. of the hammock is caught in the opening when the leg stretches or opens slightly for some reason, as has happened in a conventional baby carriage. The front part of the upper frame arm, is reinforced or supported by a reinforcing frame which remains stable even when a play stand is mounted thereon or baggage etc. is placed on the stand. Furthermore, the frame provides a solid chassis which stands when the carriage happens to collide with something, e.g., a wall.

Into a sleeve piece provided at the upper side portion of the hammock passes a sling arm, and locking members at both ends of said arm are locked into holes of the upper frame arm. Accordingly, the sling arm is firmly fixed to the upper frame arm without slipping off or getting out of place. The hammock is, therefore, securely held or supported, slung from a given position of the carriage frame, and so it will not slip along the frame arm even if a baby in the carriage moves or struggles, giving safety and good appearance to the carriage.

After the sling arm is locked to the frame arm, a flap of the hammock covers the arm and the sleeve. Thus, the side portion of the hammock, supported by the sling arm and the flap which is hooked to the upper frame arm, reliably endures a heavy load which may be placed in the hammock.

Meanwhile, each outer end portion of an inverted U-shaped hood arm bends upward to form a hanging piece, and a spring arm with a U-turn therein is transversely fitted between right and left side arms of a hood frame. Both of the uppermost ends of the hood arm are locked into holes of the hand arm. With this arrangement, the hood is supported to a given position over the baby carriage, and both sides of the hood arm do not open or stretch excessively since they are supported by the spring arm so as to have a fixed interval between both sides. In this way, the hood is easily set up or taken off. The hanging piece of the hood arm is compressed inwards towards the hand arm by the spring action of the spring arm. The spring arm is easily fitted or taken out since the arm is opened or stretched out at will with the action of the U-turn at the center of the arm.

I claim:

1. A baby carriage comprising in combination:
   a. a frame having corresponding X-shaped legs for front and rear wheels on the one and the other side thereof;
   b. support pieces (1) at the bottoms of said legs with a lower flange and an upper projecting piece acting as a spring support defined on said support pieces;
   c. a pair of front and rear transverse tubes (2) extending between said lower flanges of opposite support pieces;
   d. a separate wheel axle (3) journaled in said tubes for each of the four wheels, including holding means (3—3) holding said wheel axles to said tubes, with an outer section on said wheel axles having a wheel (6) thereon;
e. an elongated pulling piece (7) rigidly connected at one end to each axle towards the outer end thereof and a spring (4) extending between the other end of said pulling piece and said spring support, whereby each of said wheels is separately provided with a shock absorbing arrangement; and,
f. an upper frame arm (6) for the baby carriage reinforced thereunder with a U-shaped reinforcing frame (8), said reinforcing frame being pivotally supported by the uppermost end of the legs for the rear wheels.

2. A baby carriage as claimed in claim 1, having a sling arm with lock members at both ends loosely put into a sleeve piece provided at the upper end of the side part of a hammock, said lock members being held into lock holes of said upper frame arm, a hammock with fastened side flaps slinging from said frame arm, hooked up so as to cover the sling arm and the sleeve.

3. A baby carriage as claimed in claim 2, including a hood frame with a pair of rear ends of a U-shaped hood frame which bend upward to form corresponding hanging pieces, a spring arm transversely fitted between opposite extending side arms of the hood frame and the respective uppermost end of the hanging pieces bends inward to form a lock piece.

* * * * *